(12) United States Patent
Furihata (10) Patent No.: US 9,613,425 B2
(45) Date of Patent: Apr. 4, 2017

(54) THREE-DIMENSIONAL MEASUREMENT APPARATUS, THREE-DIMENSIONAL MEASUREMENT METHOD AND PROGRAM

(71) Applicant: CANON KABUSHIKI KAISHA, Tokyo (JP)

(72) Inventor: Hisayoshi Furihata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/599,368

(22) Filed: Jan. 16, 2015

(65) Prior Publication Data

US 2015/0206325 A1 Jul. 23, 2015

(30) Foreign Application Priority Data

Jan. 20, 2014 (JP) .................................. 2014-007938
Oct. 29, 2014 (JP) .................................. 2014-220689

(51) Int. Cl.
*G06T 7/60* (2006.01)
*G06T 7/00* (2006.01)
*G01B 11/25* (2006.01)

(52) U.S. Cl.
CPC ............ *G06T 7/0073* (2013.01); *G01B 11/25* (2013.01); *G06T 7/0057* (2013.01)

(58) Field of Classification Search
CPC ...... G06T 7/0073; G06T 7/0057; G01B 11/25
See application file for complete search history.

(56) References Cited

U.S. PATENT DOCUMENTS 5,615,003 A * 3/1997 Hermary ............. G01B 11/245
250/559.23
8,724,121 B2 * 5/2014 Lee .................... G01B 11/2513
356/604

(Continued)

FOREIGN PATENT DOCUMENTS

JP       1-274007 A     11/1989

OTHER PUBLICATIONS

Christian Fink, et al., "Investigative Radiology", Advances in CT Technology Part II, A Journal of Clinical and Laboratory Research, vol. 45, No. 7, Jul. 2010, pp. 445-452.

(Continued)

*Primary Examiner* — David F Dunphy
(74) *Attorney, Agent, or Firm* — Canon U.S.A., Inc. IP Division (57) ABSTRACT

A pattern having identification features on measurement lines of a multi-slit is projected to an object, and an image is acquired. Based on positions of identification features detected from the image, a measurement line number is identified for each identification feature. Based on a position of a selected identification feature on the image, a position and a slope of an epipolar line in a coordinate system of the pattern are calculated. The position and slope of the epipolar line are calculated by projecting a straight line extending from the position of the selected identification feature to a line-of-sight direction onto the coordinate system. Because the position of the selected identification feature in the coordinate system is on the epipolar line, a measurement line having an identification feature on the epipolar line is searched on the pattern to identify the measurement line number for the selected identification feature.

18 Claims, 7 Drawing Sheets

(56) References Cited

U.S. PATENT DOCUMENTS

| | | | |
|---|---|---|---|
| 9,448,064 B2* | 9/2016 | Atanassov | G06T 5/001 |
| 2011/0262007 A1* | 10/2011 | Kojima | G01B 11/2509 |
| | | | 382/103 |
| 2013/0127998 A1* | 5/2013 | Kobayashi | G01B 11/00 |
| | | | 348/46 |
| 2013/0293684 A1* | 11/2013 | Becker | G01B 11/245 |
| | | | 348/47 |
| 2014/0267623 A1* | 9/2014 | Bridges | G01S 17/003 |
| | | | 348/46 |
| 2015/0362737 A1* | 12/2015 | Zackay | G02B 23/00 |
| | | | 348/36 |

OTHER PUBLICATIONS

Makoto Kimura et al.; "Projector Calibration using Arbitrary Planes and Calibrated Camera"; Digital Human Research Center, National Institute of Advanced Industrial Science and Technology, Japan.
Roger Y. Tsai; "A Versatile Camera Calibration Technique for High-Accuracy 3D Machine Vision Metrology Using Off-the-Shelf TV Cameras and Lenses"; IEEE Journal of Robotics and Automation; vol. RA-3, No. 4, Aug. 1987, pp. 323-344.

* cited by examiner

THREE-DIMENSIONAL MEASUREMENT APPARATUS, THREE-DIMENSIONAL MEASUREMENT METHOD AND PROGRAM

BACKGROUND OF THE INVENTION

Field of the Invention

The present invention particularly relates to a three-dimensional measurement apparatus, a three-dimensional measurement method and a program for measuring a three-dimensional shape of an object having a minute shape.

Description of the Related Art

In the past, a light section method has been known as a three-dimensional-shape measurement method supporting a dynamic scene. The light section method projects an illumination pattern containing a plurality of parallel lines to an object (hereinafter, such a plurality of parallel lines will be collectively called a multi-slit, and each of the lines will be called a measurement line). The light section method using a plurality of measurement lines may be implemented through identification of the ordinal number in a projected multi-slit of a measurement line observed on an object. One method for identifying a measurement line number indicating the ordinal number of a measurement line in a multi-slit may use a pattern including some feature (identification feature) added to a multi-slit.

Japanese Patent Laid-Open No. 1-274007 discloses a method which measures a three-dimensional shape by using a pattern including slits randomly arranged on measurement lines of a multi-slit. According to the method, a measurement line is divided into a plurality of segments so that the measurement line is identified through calculation based on positions of two points of both ends of the segments.

As described above, measurement of a three-dimensional shape of an object may require identification of a measurement line number of an observed measurement line of a multi-slit. Because the method disclosed in Japanese Patent Laid-Open No. 1-274007 may require a length for two points of both ends of a segment for identification of a measurement line number, a measurement line number may not be identified in a minute part. As a result, a three-dimensional shape of an object having a minute shape may not be measured.

The present invention provides a technology which allows robust measurement of a three-dimensional shape of an object having a minute shape.

SUMMARY OF THE INVENTION

A three-dimensional measurement apparatus according to the present invention includes an outputting unit configured to project a pattern which includes a plurality of lines and in which at least a part of features on the plurality of lines are arranged at unequal intervals from a projection unit to an object, an acquiring unit configured to acquire an image including an object to which the pattern is projected, a detecting unit configured to detect lines and features of the projected pattern from the image acquired by the acquiring unit, an identifying unit configured to identify to which line of the plurality of lines of the pattern each of the features detected by the detecting unit belongs based on positions of the features detected by the detecting unit, and a measuring unit configured to measure a three-dimensional shape of the object to which the pattern is projected based on an identification result of the identifying unit.

Further features of the present invention will become apparent from the following description of exemplary embodiments with reference to the attached drawings.

DESCRIPTION OF THE EMBODIMENTS

Embodiments of the present invention will be described below in detail with reference to attached drawings.

Figure 9:
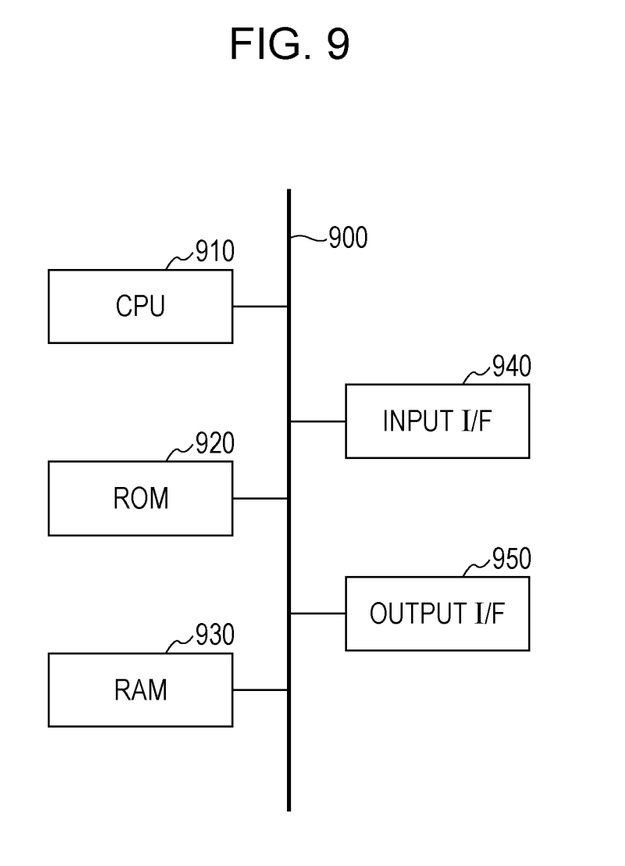
FIG. 9 illustrates a hardware configuration according to any one of embodiments described herein.

Before describing details of embodiments of the present invention, a hardware configuration of an information apparatus according to any one of embodiments will be described first with reference to FIG. 9. Referring to FIG. 9, a CPU 910 generally controls devices connected via a bus 900. The CPU 910 reads out and executes processing steps and programs stored in a read-only memory (ROM) 920. Processing programs, device drivers and others including an operating system (OS) according to this embodiment are stored in the ROM 920, are temporarily stored in a random access memory (RAM) 930, and are executed properly by the CPU 910. An input I/F 940 receives an image input from an external device or apparatus (such as an image capturing apparatus) as an input signal in a processable form. The output I/F 950 outputs to the external device or apparatus a signal (output signal) in a form that the output signal may be processable by the external device or apparatus.

First Embodiment

Figure 1:
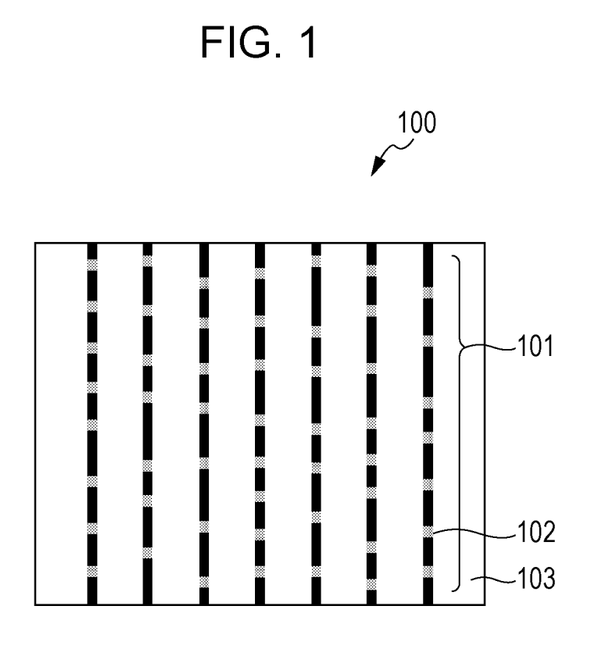
FIG. 1 illustrates an example of a pattern including identification features on measurement lines.

According to a first embodiment, a three-dimensional shape measurement method will be described which supports an object having a minute shape. According to this embodiment, as illustrated in FIG. 1, a pattern 100 is used which includes identification features 102 on measurement lines 101 of a strength multi-slit. Hereinafter, details of this embodiment will be described.

Figure 2:
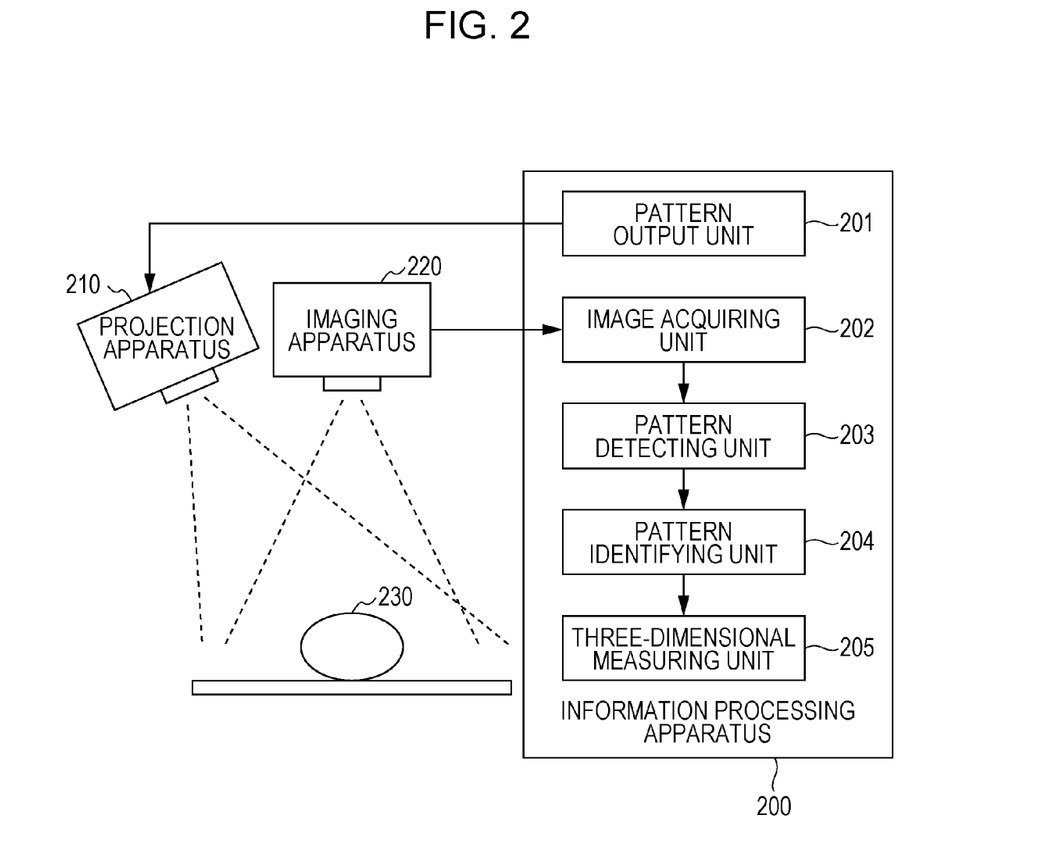
FIG. 2 is block diagram illustrating a functional configuration example of an information processing apparatus according to an embodiment.

FIG. 2 is a block diagram illustrating a functional configuration example of an information processing apparatus 200 according to this embodiment.

As illustrated in FIG. 2, the information processing apparatus 200 of this embodiment externally includes a projection apparatus 210 and an image capturing apparatus 220 and further includes a pattern outputting unit 201, an image acquiring unit 202, a pattern detecting unit 203, a pattern identifying unit 204, and a three-dimensional measuring unit 205.

The projection apparatus 210 may be a projector, for example, and is an apparatus configured to project a light and shade pattern. It should be noted that internal parameter information such as a focal point distance, a main point position, and a lens distortion parameter for the projection apparatus 210 and relative position and orientation information of the projection apparatus 210 with respect to the image capturing apparatus 220 are calibrated in advance. The calibration may be implemented according to the method disclosed in M, Kimura, "Projector Calibration using Arbitrary Planes and Calibrated Camera" Computer Vision and Pattern Recognition, CVPR, 2007, for example.

The image capturing apparatus 220 is a camera configured to capture a gray image. The internal parameter information such as a focal point distance, a main point position, and a lens distortion parameter of the image capturing apparatus 220 are also calibrated in advance. The calibration may be implemented according to the method disclosed in R. Y. Tsai, "A versatile camera calibration technique for high-accuracy 3D machine vision metrology using off-the-shelf TV cameras and lenses" IEEE Journal of Robotics and Automation, vol. RA-3, no. 4, 1987, for example.

The pattern outputting unit 201 outputs a pattern to be projected to a measurement target object 230 to the projection apparatus 210. The image acquiring unit 202 acquires an image acquired by imaging an object to which the pattern is projected from the image capturing apparatus 220. The pattern detecting unit 203 detects measurement lines and identification features of the pattern projected by the projection apparatus 210 from the image acquired by the image acquiring unit 202. The pattern identifying unit 204 identifies a measurement line number for each one identification feature detected by the pattern detecting unit 203. In other words, the pattern identifying unit 204 identifies to which measurement line of the multi-slit the subject identification feature on the image belongs. The three-dimensional measuring unit 205 calculates a position of a three-dimensional point on a surface of the measurement target object 230 to which the pattern is projected based on the identification result of the pattern identifying unit 204.

Figure 3:
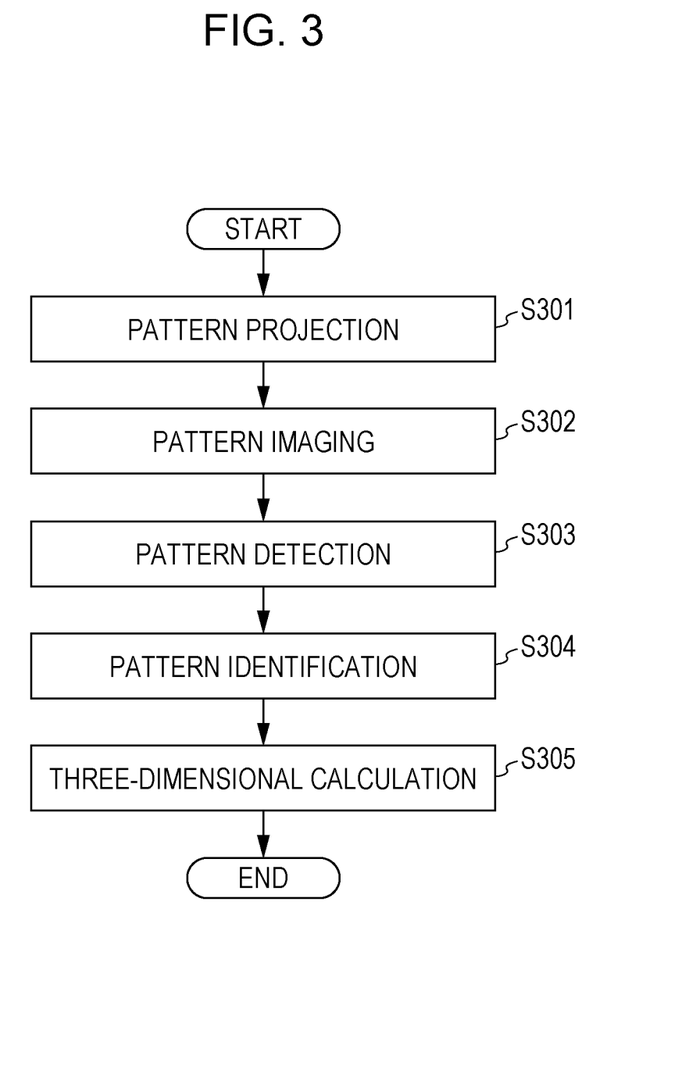
FIG. 3 is a flowchart illustrating an example of a processing procedure for measuring a three-dimensional shape according to a first embodiment.

Next, a processing procedure of this embodiment will be described. FIG. 3 is a flowchart illustrating an example of a processing procedure for measuring a three-dimensional shape according to this embodiment.

Step S301

The pattern outputting unit 201 outputs a pattern to be projected to the projection apparatus 210, and the pattern is projected from the projection apparatus 210 to the measurement target object 230. The pattern to be output here is a pattern 100 having identification features 102 on measurement lines 101 of a multi-slit, as illustrated in FIG. 1, for example. The pattern to be projected is set such that measurement lines and a background part of the pattern may be observed with different pixel values on an image and such that the measurement lines and identification features may be observed with different pixel values on the image. According to this embodiment, the pattern 100 illustrated in FIG. 1 is a light and shade pattern in which the measurement lines 101 are projected with higher brightness than those of the background part 103 and the identification features 102 is projected with higher brightness than that of the measurement lines 101.

The pattern is projected in a manner that measurement lines thereof may be arranged at equal intervals such that they may be evenly projected. For higher discrimination capability, the identification features are arranged at different unequal intervals from each other on measurement lines such that the correlation between positions of identification features on different lines may be low. According to this embodiment, each of the intervals between identification features on a measurement line is defined as $L+\Delta L$ where $L$ is a fixed value designated by a user, and $\Delta L$ is a uniform random number generated in a predetermined range $[-\epsilon$ to $\epsilon]$. $\epsilon$ is a fixed value designated by a user.

Step S302

The image capturing apparatus 220 images the pattern projected to the measurement target object 230, and the image acquiring unit 202 acquires the image from the image capturing apparatus 220.

Step S303

The pattern detecting unit 203 detects measurement lines and identification features from the image acquired by the image acquiring unit 202. First, before measurement lines are detected from the image, a smoothing filter is applied to the image to prevent detection of measurement lines divided at an identification feature due to an influence of a difference in pixel value between the measurement lines and the identification feature on the image so that the difference in pixel value between the measurement lines and identification features may be reduced.

After the smoothing filter is applied to the image, the measurement lines are detected. More specifically, a sobel filter is applied to the smoothed image to detect extremum values (hereinafter, each of which will be called an edge) of pixel values on the image. Then, adjacent edges between pixels are labeled to detect a measurement line. An identification feature is detected next. In order to detect an identification feature, a pixel having a different pixel value from those of surrounding pixels is searched through pixel values (pixel value on an image before smoothed) on the detected measurement line. More specifically, a pixel having an extremum value is detected as an identification feature with reference to pixel values on the measurement line.

Step S304

Figure 4A:
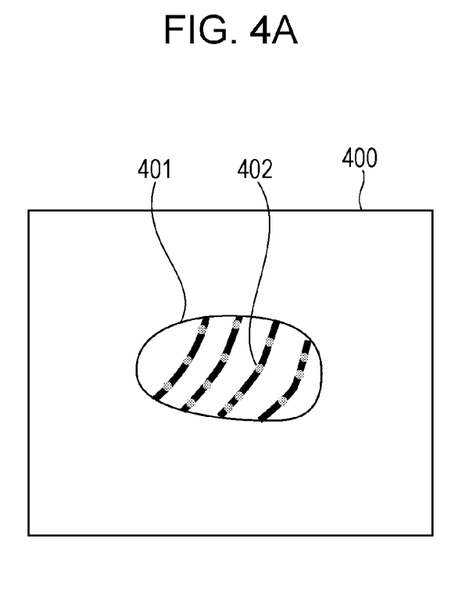
FIGS. 4A and 4B are diagrams for explaining a method for identifying a measurement line number for each one identification feature.
Figure 4B:
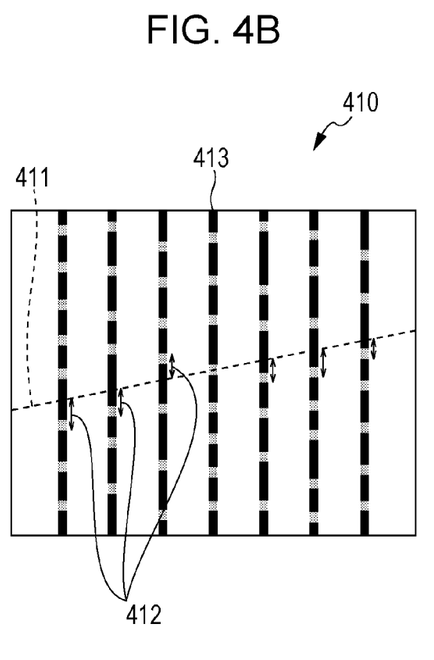

The pattern identifying unit 204 identifies a measurement line number for each one identification feature based on a position of the identification feature detected by the pattern detecting unit 203. How a measurement line number is identified will be described below with reference to FIGS. 4A and 4B. An image 400 illustrated in FIG. 4A represents an image acquired by imaging the measurement target object 401. A pattern 410 illustrated in FIG. 4B represents a pattern projected to the measurement target object 401.

First, one of identification features 402 detected from the image 400 is selected. Next, a position and a slope of an epipolar line 411 in a coordinate system of the pattern are calculated based on the position of the selected identification feature on the image 400. The position and slope of the epipolar line 411 may be calculated by projecting a straight line extending from the position of the selected identification feature to a line-of-sight direction onto the coordinate system of the pattern.

Here, because the position of the selected identification feature in the coordinate system of the pattern is on the epipolar line 411, a measurement line having an identification feature on the epipolar line 411 may be searched on the pattern 410 to identify the measurement line number for the selected identification feature. More specifically, coordinates of intersections of measurement lines of a multi-slit and the epipolar line 411 are calculated, and distances 412 from the intersections to identification features close to the intersections are then calculated, as illustrated in FIG. 4B. The measurement line number of a measurement line 413 having a shortest distance among the calculated distances is selected as an identification result. This operation may be performed on all identification features detected on the image to identify a measurement line number for each identification feature.

Step S305

The three-dimensional measuring unit 205 calculates a position of a three-dimensional point of a surface of the measurement target object 230 to which the pattern is projected based on the identification result calculated by the pattern identifying unit 204. In this process, one pixel is first selected from the measurement line detected by the pattern detecting unit 203. Next, a position of a three-dimensional point to which the measurement line is projected is measured by using a principle of a light section method from a position of the selected pixel on the measurement line and a measurement line having the measurement line number identified from a neighboring identification feature on the identical measurement line. This operation may be performed on all pixels on the measurement line detected from the image so that three-dimensional points on the surface of the measurement target object 230 may be calculated.

The method of this embodiment may allow identification of a measurement line number for each one identification feature of a measurement line observed on an image and thus even allows identification of a measurement line number of a minute part. Furthermore, it may not require measurement lines arranged at rough intervals among a plurality of measurement lines. Thus, measurement lines may be observed in a minute part. Therefore, according to this embodiment, a three-dimensional shape of an object having a minute shape may be measured robustly.

The projection apparatus 210 of this embodiment may be any apparatus configured to project a two-dimensional pattern. For example, it may be a projector configured to project a two-dimensional image or other apparatus including a combination of a light source and a mask pattern. A pattern to be projected here may be a light and shade pattern or may be a polychrome pattern. Also in this case, a pattern to be projected is set so as to allow observation of different pixel values or shapes on an image between measurement lines and a background part of the pattern and further allow observation of different pixel values or shapes on the image between the measurement lines and identification features. For example, the brightness or color of projected light may be changed. The identification features may be changed their shapes. In other words, any pattern is applicable as far as the background part, measurement lines and identification features may be distinguished based on image information. In a case where a projector is used in which a mask pattern is set, the pattern is set physically in the projector. Thus, no pattern is required to be given from a pattern outputting unit for measurement. Therefore, the pattern outputting unit may be excluded from the information processing apparatus 200 according to this embodiment.

The identification features may be arranged on measurement lines in any manner as far as they are arranged at unequal intervals. The identification features may be arranged at different unequal intervals from each other on measurement lines such that the correlation between positions of identification features on different lines may be low. Measurement lines having identification features at identical unequal intervals may be provided. In a case where there are measurement lines having identification features arranged at identical unequal intervals, the measurement lines may be identified by changing the colors or thicknesses of measurement lines having identical feature positions and identification feature to give information by which they may be distinguished to prevent misidentification. In a case where an epipolar line is drawn from an identification feature detected on an image to search a corresponding measurement line, a projection apparatus and an image capturing apparatus may be located such that the epipolar line and measurement lines are not vertical as illustrated in FIG. 4B. Thus, depending on the inclination of the epipolar line, differences may occur in position (position horizontal to the measurement line) of the intersection between the epipolar line and the measurement lines. Therefore, misidentification may not occur even when identification features are arranged at identical unequal intervals on measurement lines.

The measurement lines may be arranged either at equal intervals or at unequal intervals. The measurement lines may be arranged in any manner as far as identification features are arranged on measurement lines at different unequal intervals from each other between the measurement lines so that the correlation between positions of the identification features may be low between the different measurement lines. For example, uniform random numbers generated within a predetermined range or pseudo-random numbers based on an M sequence may be used for the intervals of identification features.

Arranging identical features at different unequal intervals from each other between the measurement lines means that the positions of identification features arranged on the corresponding measurement lines are different. All of identification features are not required to be arranged at unequal intervals on measurement lines for a low correlation of positions of the identification feature between different measurement lines. Partial identification features may be arranged at equal intervals. In other words, at least partial identification features may be arranged at unequal intervals among identification features on a plurality of measurement lines. In summary, at least partial identification features of identification features on a plurality of measurement lines may be arranged at unequal intervals on the measurement lines.

The brightnesses and locations of measurement lines and identification features of a pattern to be projected may be set by a pattern generation unit which is provided separately, instead of the pattern outputting unit 201. The image acquiring unit 202 may acquire any image as far as it is a two-dimensional image. For example, it may be a gray image or a polychrome image. Such an image may be acquired directly from the image capturing apparatus 220 or may be saved in a memory once and be then acquired from the memory. The method for calculating a position of a three-dimensional point on a surface of the measurement target object 230 to which the three-dimensional measuring unit 205 projects a pattern may be any method based on a light section method.

Any method is applicable for detecting measurement lines in the pattern detecting unit 203 as far as the method detects measurement lines on an image. For example, a measurement line may be detected by labeling an edge detected with a sobel filter or may be detected by performing a thinning process on an image binarized with a predetermined threshold value. Any method is applicable for detecting an identification feature on a measurement line as far as the method detects identification features having different pixel values on measurement lines. For example, a position having an extremum pixel value on a measurement line may be detected as an identification feature, or a position of a pixel having a predetermined value of a difference from a mean value of pixel values on measurement lines. In a case where the width of an identification feature is increased as an example that the shape of an identification feature on a measurement line is changed, a position having an extremum line width on a measurement line may be searched to detect an identification feature having a different shape on a measurement line.

First Variation Example

A pattern variation according to the present invention will be described as a variation example. As in the first embodiment, a pattern to be projected is set such that measurement lines and a background part of the pattern on an image may be observed as different pixel values and that the measurement lines and identification features may be observed as different pixel values or shapes on an image.

Figure 7:
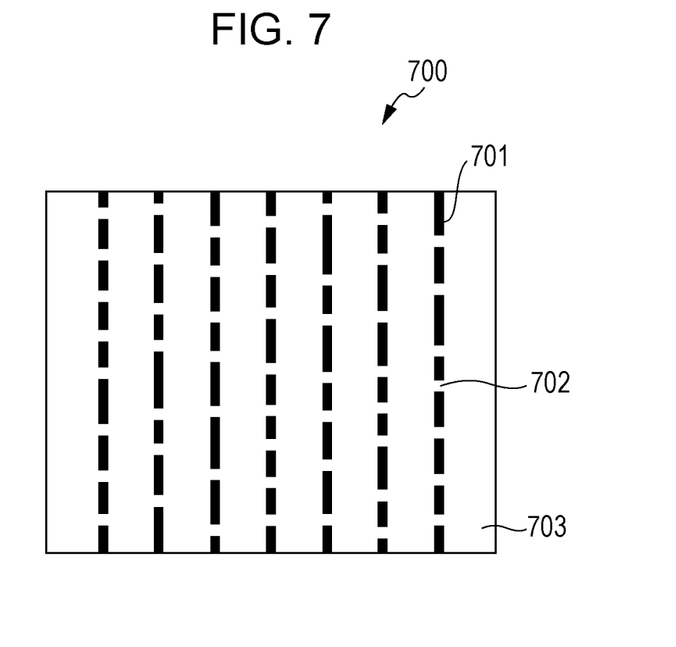
FIG. 7 illustrates an example of a pattern in a case where an identification feature is handled as a break on a measurement line in a first variation example.

For example, when identification features are represented by different pixel values on a measurement line, the identification feature may have an equal pixel value to that of its background. In other words, as in a pattern 700 in FIG. 7, an identification feature 702 and a background 703 may have an equal pixel value, and a measurement line 701 may be divided into a plurality of segments by the identification feature 702. In this case, the measurement line observed on the image has a plurality of segments. Because a detecting unit detects a measurement line after an image is smoothed and a difference in pixel value between the measurement line and an identification feature observed on the image is reduced, as in the first embodiment, the measurement line having segments may be labeled and detected as one continuous line.

Figure 8:
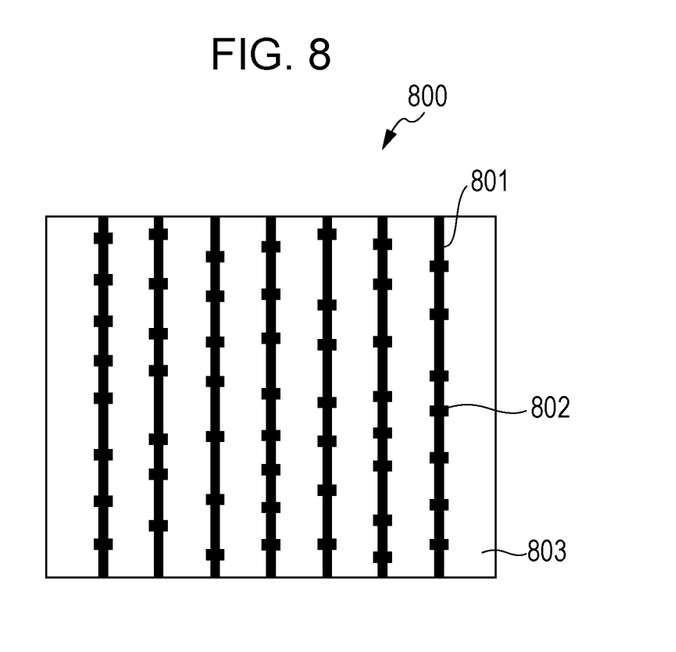
FIG. 8 illustrates an example of a pattern in which an identification feature has a different size from a thickness of a measurement line in the first variation example.

As another pattern variation, a distinctive size of an identification feature may be set. A pattern 800 in FIG. 8 is an example having identification features and measurement lines having different set sizes, and an identification feature 802 has a different size from that of a measurement line 801. In this case, the measurement line 801 and identification feature 802 may have an equal pixel value or may have different pixel values. It is assumed here that a background 803 and the measurement line 801 in FIG. 8 have different pixel values. In a case where the identification features have a larger size, line widths on measurement lines detected on an image may be examined, and a position having an extremum line width may be searched in order to detect an identification feature having a different shape on the measurement lines. Alternatively, identification features may have a circular shape or a triangular shape. An identification feature may have any shape as far as the position of the identification feature on a measurement line detected on an image may be identified from the shape of identification features.

As in the first variation example, a pattern to be projected according to the present invention may be any pattern as far as it is set such that measurement lines and a background part of the pattern on an image may be observed as different pixel values and that the measurement lines and identification features may be observed as different pixel values or shapes on an image.

In the first embodiment and the first variation example, the detection of a measurement line by a detecting unit may include smoothing an image acquired by an image acquiring unit to reduce a difference in pixel value between a measurement line and an identification feature observed on the image. Thus, a measurement line having identification features may be labeled and detected as one continuous line. Another detection method may be used in a case where a measurement line is divided by identification features and has a plurality of segments as in the first variation example. For example, after a plurality of segments observed on an image are detected separately, an endpoint of a detected segment and an endpoint of a surrounding segment may be associated and labeled as one line for detection. In this method, for an image acquired by an image acquiring unit, a position having an extremum pixel value of the image is first calculated, and an adjacent position to the position having the extremum value may be connected to the position having the extremum value to one line by a labeling process to detect segments of a measurement line. Because the detected measurement line is divided by segments between identification features, segments that are close in a range of a predetermined threshold value T from an endpoint of a segment detected on the image are searched, and, if any close segments exist, endpoints of the segments are connected. The detection of a position of an identification feature may include calculating a center position of connected two endpoints as a position of an identification feature or calculating a position of an identification feature by searching a pixel having a different pixel value from that of a surrounding pixel on a detected measurement line, as in the first embodiment.

Second Embodiment

A method according to this embodiment will be described which uses positions of identification features detected on an image and an adjacency relationship between them to identify a measurement line number for each one identification feature on the image. According to this embodiment, an adjacency relationship between identification features on an image and the order of measurement line numbers identified from the identification features are constrained to be matched so that the measurement line numbers of the identification features may be identified. In other words, identification features on one measurement line on an image are identified with an identical measurement line number, and identification features on several different measurement lines on an image are identified with an equal number of measurement line numbers to the number of measurement lines.

This embodiment is different from the first embodiment in process details of step S304 in FIG. 3 according to the first embodiment and is the same as the first embodiment in other constituent elements and processing procedures. The processing procedure in step S304 according to this embodiment will be described.

Step S304

The pattern identifying unit 204 identifies a measurement line number for each one identification feature based on positional relationship between identification features detected by the pattern detecting unit 203. First, like the first embodiment, based on positions of identification features on an image, a position and a slope of an epipolar line in a coordinate system of the pattern are calculated, and a distance from each intersection of the epipolar line and each measurement line of a multi-slit to a close identification feature is calculated.

Here, a distance calculated for each identification feature and each measurement line is $D_i(n_i)$ where i represents an ID of an identification feature detected on an image, and $n_i$ represents a measurement line number in a multi-slit. In this case, $D_i(n_i)$ represents cost (hereinafter, called an identification cost) when a measurement line number $n_i$ is identified for an identification feature i. In other words, it may deduced that a measurement line number n with a lowest identification cost $D_i(n_i)$ only for the identification feature i is a most likely identification result.

Figure 5:
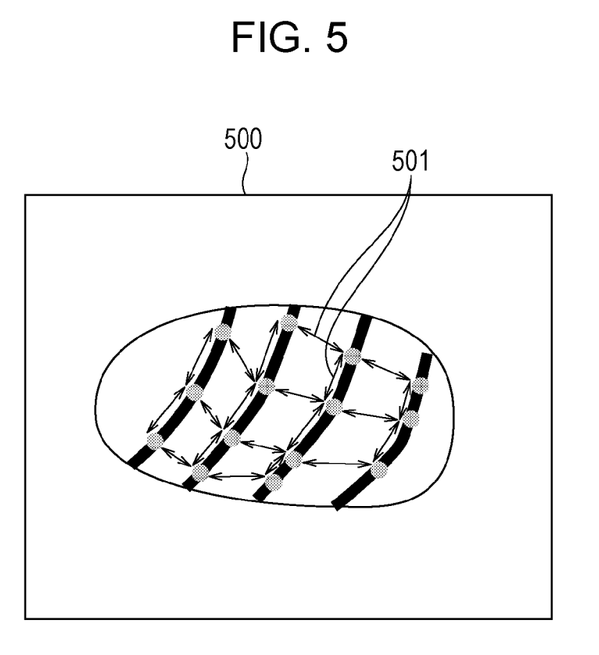
FIG. 5 illustrates an example of a result of connection of adjacent identification features on an image according to a second embodiment.

Next, a link is constructed which represents an adjacency relationship between identification features on an image. FIG. 5 illustrates an example of a result of connection of adjacent identification features on an image 500, and arrows 501 represents links. Such a link may be constructed by searching an identification feature close in a direction of a line and a direction crossing the line to a position of an identification feature detected on an image. The searching in the directions of a line is performed in a range to endpoints of the measurement lines to construct a link with a close identification feature on the measurement line. On the other hand, the searching in the direction crossing the line is performed in a range of a predetermined distance R set by a user, and a link is constructed a nearest neighbor identification feature. No link is constructed if no adjacent identification feature exists within the range. Finally, a measurement line number of each identification feature is identified by constraining such that an adjacency relationship between identification features on an image and the order of measurement line numbers identified from the identification features are may be matched. More specifically, a measurement line number for each identification feature is calculated such that an evaluation function E of the following expression (1) may be at a minimum.

$$E = \sum_{i \in P} D_i(n_i) + \sum_{(i,j) \in N} W(n_i, n_j) \quad (1)$$

In Expression (1), P is a set of identification features detected on an image, N is a set of a pair of identification features between which a link is constructed among identification features detected on the image. i, j represent IDs of identification features detected on the image, $n_i$, $n_j$ represent measurement line numbers identified for identification features i, j.

Expression (1) includes a function W depending on a relationship between measurement line numbers identified for adjacent identification features in addition to the identification cost $D_i(n_i)$ of the identification features. The function W is 0 when the order of the measurement line numbers $n_i$, $n_j$ is matched with the positional relationship of the identification features i, j on an image and otherwise is a predetermined cost d. The cost d is a fixed value set by a user, and as the value of the cost d increases, the strength of constraint of the adjacency relationship between identification features on an image increases. Use of Expression (1) allows selection of a combination of an identification feature and a measurement number which generates a minimum evaluation function E including an identification cost D and a function W from combinations of identification features detected on an image and corresponding measurement line numbers based on an identification cost $D_i(n_i)$ representing a degree of correspondence to each measurement line number based on identification features and a function W representing matching between the order of identification features and measurement line numbers to be set. Thus, a measurement line number for each identification feature may be identified.

In order to calculate a solution (identification result of each identification feature here) for a minimum evaluation function E, an optimization algorithm using BP (Belief Propagation) is used in this embodiment. For process details of BP, a method is used which is disclosed in P. Felzenszwalb and D. Huttenlocher, "Efficient belief propagation for early vision," IJCV, vol. 70, pp. 41-54, 2006, for example. By implementing the aforementioned methods, a measurement line number for each identification feature may be identified in consideration of a positional relationship between identification features on an image.

This embodiment may reduce misidentification by restring an adjacency relationship between identification features for identifying a measurement line number for each of identification features detected from an image. As a result, a three-dimensional shape of an object having a minute shape may be robustly measured.

In a case where an adjacency relationship between identification features is used as in this embodiment, any method is applicable as far as a measurement line number is identified for an identification feature in a manner that the adjacency relationship between identification features on an image and the order of measurement line numbers calculated from the identification features may be matched. For example, a measurement line number for each identification feature may be identified by using an optimization algorithm based on identification costs of identification features and a constraint of adjacency relationship between identification features. A measurement line number may be identified based on votes for identification results acquired by polling a measurement line number identified from an identification cost of each identification feature to a surrounding adjacent identification feature. The optimization calculation may apply BP (Belief Propagation) or GC (Graph Cut).

Third Embodiment

A method according to a third embodiment will be described which adjusts a distribution of identification features of a pattern in accordance with a shape of an object. According to this embodiment, identification features are projected at rough intervals to a wide and smooth region where identification features may be easily observed, and identification features are projected at close intervals to a fine region or a stepped part where identification feature may not be easily observed.

This embodiment is different from the first embodiment in process details in step S301 in FIG. 3 according to the first embodiment, and other constituent elements and processing procedures of this embodiment are the same as those of the first embodiment. A processing procedure in step S301 according to this embodiment will be described.

Step S301

The pattern outputting unit 201 outputs a pattern to be projected to the projection apparatus 210, and the pattern is projected from the projection apparatus 210 to a measurement target object 230. The pattern to be output here is set in accordance with a shape of an object to which the pattern is to be projected, unlike the first embodiment. More specifically, a distribution of identification features in the pattern is determined such that identification features may be projected at rough intervals to a wide and smooth region where identification features may be easily observed and that identification features are projected at close intervals to a fine region or a stepped part where identification feature may not be easily observed. This may suppress the total number of identification features in a pattern compared with a method which sets identification features uniformly closely based on a fine region. Thus, in identifying identification features detected on an image, the probability of identification of improper measurement lines because the number of identification features close to an epipolar line on the pattern is reduced. In order to accomplish this, the degrees of minuteness of targets to which regions of the pattern are to be projected are required to calculate.

According to this embodiment, degrees of minuteness of targets to which regions of a pattern are to be projected are calculated based on information regarding three-dimensional points on a surface of the measurement target object 230 which is acquired by performing a pre-measurement on the configuration according to the first embodiment. More specifically, a pattern is first divided into a plurality of macro blocks. Next, a variance σ of distances of three-dimensional points to which the corresponding macro block is to be projected is calculated. Because the variance σ increases depending on the concaves and convexes of an object surface, it may be considered that the degree of minuteness of targets to which the macro blocks are to be projected depends on the magnitude of the variance σ. As the variance σ increases, identification features of a macro block of the pattern are set more closely. As the variance σ decreases, identification features are set more roughly. According to this embodiment, identification features of each macro block of a pattern are set at intervals (L+ΔL)/A where A=a*σ, and a is a fixed value set by a user. For a macro block to be projected to a target with no object, no identification features are set.

As described above, this embodiment adjusts a distribution of identification features on a pattern in accordance with a shape of an object to which the pattern is to be projected to suppress the total number of identification features and thus reduce misidentification. This is because a suppressed total number of identification features on a pattern may reduce the number of identification features close to an epipolar line on the pattern when identification features detected from the image are identified. As a result, a three-dimensional shape of an object having a minute shape may be measured robustly.

Any method is applicable for setting a distribution of identification features in regions of a pattern as far as the method arranges a distribution of identification feature based on a degree of minuteness of a shape of an object to which a pattern is to be projected. The degree of minuteness of an object shape to which a pattern is to be projected may be determined from an area or variations of distances to a plane to which a corresponding region of the pattern is to be projected based on a three-dimensional shape model of the measurement target object 230 and schematic information of its position and orientation, for example.

In this case, the position and orientation of the measurement target object 230 may be acquired by pattern matching from an image acquired by imaging the measurement target object 230 or may be given by a user through a user interface. A 6 degrees of freedom sensor may be attached to the measurement target object 230, and information on the position and orientation may be acquired from the 6 degrees of freedom sensor. An image projecting a geometric model of a measurement target object on a pattern may be presented to a user, and the user may be prompted to input a designated density and positions of identification features for each region of the pattern. A memory, not illustrated, which holds a degree of minuteness of an object shape to which a pattern is to be projected may be separately prepared, and a distribution of identification features may be calculated based on a degree of minuteness read from the memory.

Fourth Embodiment

A method according to a fourth embodiment will be described which identifies by using a pattern having a plurality of types of identification features instead of a single type of identification feature. This embodiment is different from the first embodiment in the process details of steps S301 and S304 in FIG. 3, and other constituent elements and processing procedures of this embodiment are the same as those of the first embodiment. Processing procedures in steps S301 and S304 according to this embodiment will be described.

Step S301

Figure 6:
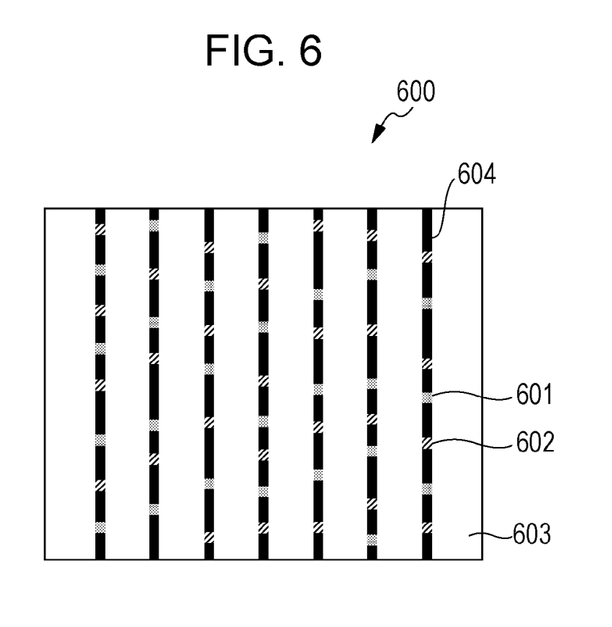
FIG. 6 illustrates an example of a pattern having a plurality of types of identification feature according to a fourth embodiment.

The pattern outputting unit 201 outputs a pattern to be projected to the projection apparatus 210, and the pattern is projected from the projection apparatus 210 to the measurement target object 230. A pattern 600 having a plurality of types of identification features 601 and 602 as illustrated in FIG. 6 is output here, unlike the first embodiment. A case that a pattern has two types of identification features will be described according to this embodiment.

Like the first embodiment, the pattern to be projected is set such that measurement lines and a background part of the pattern may be observed with different pixel values on an image and such that the measurement lines and identification features may be observed with different pixel values on the image. According to this embodiment, the pattern 600 illustrated in FIG. 6 is a light and shade pattern in which measurement lines 604 are projected with higher brightness than a background part 603 and one identification feature 601 is projected with higher brightness than the measurement lines 604 and the other identification feature 602 is projected with lower brightness. The arrangement order of the two types of identification features 601 and 602 may be set such that the types may be distributed evenly on the pattern 600. According to this embodiment, they are arranged alternately on the measurement lines 604. The intervals between the measurement lines 604 and the intervals of the identification features 601 and 602 are the same as those in the pattern acquired in the first embodiment.

Step S304

The pattern identifying unit 204 identifies a measurement line number for each one identification feature based on the position and type of the identification feature detected by the pattern detecting unit 203. First, like the first embodiment, based on positions of identification features on an image, a position and a slope of an epipolar line in a coordinate system of the pattern are calculated, and a distance from each intersection of the epipolar line and each measurement line of a multi-slit to a close identification feature is calculated. In this case, the distance from each intersection of the epipolar line and each measurement line of a multi-slit to a close identification feature is calculated for an identification feature of the same type as that of the identification feature subject to the identification. This calculation may narrow the identification feature on the pattern by the type, which may reduce misidentification. Finally, the measurement line number of the measurement line at the shortest distance calculated from the intersection is selected as an identification result.

According to this embodiment, candidates of measurement lines to be identified may be narrowed by the positions and types of identification features detected on an image. Thus, misidentification may be reduced. As a result, a three-dimensional shape of an object having a minute shape may be measured robustly.

As described above, three or more types of identification features may be arranged in a pattern. In a case where a plurality of identification features are arranged in a pattern, any distribution of types of identification features on measurement lines may be used as far as the types of identification features are distributed evenly on the pattern. For example, different types of identification features may be arranged alternately on measurement lines or may be arranged in random order.

Fifth Embodiment

According to a fifth embodiment, a method will be described which detects a plurality of positions of identification features on an image and removes outliers included therein to measure a three-dimensional shape robustly. The term "outlier" refers to a position where a position that is not an identification feature is wrongly judged as an identification feature due to an influence such as noise on an image when positions of identification features are detected. In a case where an outlier is included when measurement line numbers are identified, misidentification may occur. According to this embodiment, a predetermined condition is given to arrangement of identification features in a pattern according to the present invention, a plurality of positions of identification features are detected from measurement lines observed on an image. Then, a position that does not satisfy the predetermined condition is removed as an outlier for robust measurement of a three-dimensional shape.

This embodiment is different from the first embodiment in process details of step S301 and step S303 in FIG. 3 according to the first embodiment. Other constituent elements and processing procedures of this embodiment are the same as those of the first embodiment. Processing procedures in step S301 and step S303 according to this embodiment will be described below.

Step S301

The pattern outputting unit 201 outputs a pattern to be projected to the projection apparatus 210, and the pattern is projected from the projection apparatus 210 to a measurement target object 230. The pattern to be output here is a pattern having measurement lines and identification features for which different pixel values are set according to the first exemplary embodiment, and a predetermined condition is given to intervals between identification features arranged on measurement lines. More specifically, if a minimum value of intervals between identification features on one line, a maximum value is set lower than 2X. According to this embodiment, a user designates a minimum value of intervals between identification features as A and a maximum value as B (B<2A). Identification features may be set in a pattern to be projected at intervals set with uniform random numbers occurring in a range [A to B] between identification features on measurement lines.

Step S303

The pattern detecting unit 203 detects measurement lines and identification features from the image acquired by the image acquiring unit 202. First, a method similar to the detection method according to the first embodiment detects measurement lines and positions of identification features on the measurement lines from the image. However, under a condition where they are not easily detected such as a case where a subject image has much noise, positions to be outliers may be detected when positions of identification features are detected. Hereinafter, a detected identification feature will be called a candidate feature, and a method for removing an outlier from candidate features will be described.

First, for each of candidate features, an interval with a nearest neighbor candidate feature (hereinafter, called a candidate feature pair) on the same measurement line on an image is calculated. The interval between a candidate feature pair is calculated perpendicularly to a direction of an epipolar line crossing a candidate point on the image. If the candidate feature pair does not contain an outlier, the corresponding interval Lc may occur in a range [sA<Lc<sB] [pixel]. Here, c is a subscript representing an interval between a proper candidate feature pair which does not contain outliers and is a scale indicative of a ratio of an interval between identification features in a pattern generated by the projection apparatus 210 and an interval on an image acquired by the image capturing apparatus 220. The value s may be calculated based on s=fc/fp where fp and fc are focal point distances of the projection apparatus 210 and image capturing apparatus 220 or may be fixed values designated by a user, for example.

On the other hand, if a candidate feature pair contains an outlier, a position of the outlier occurs between proper candidate features. Because the interval between proper candidate features is sB [pixel] at a maximum, the interval between the candidate feature pair including the outlier occurring therein is sB/2 [pixel] at a maximum. In other words, an interval Le between the candidate feature pair including an outlier may occur in a range [0<Le<sB/2] [pixel]. Here, e is a subscript representing an interval between a candidate feature pair including an outlier.

In summary, the range Lc of the interval occurring between proper candidate feature pair is [sA<Lc<sB] [pixel], and the range of the interval occurring between a candidate feature pair including an outlier is [0<Le<sB/2] [pixel]. In this case, the two range do not overlap because of the relationship B<2A in the pattern design condition. Using this characteristic, if there is a candidate feature pair at an interval which is not an interval between a proper candidate feature pair and is smaller than sA[pixel], one of the pair may be judged as an outlier.

Next, a candidate feature having a higher detection strength of the candidate feature pair including an outlier is judged as an outlier. Here, the term "detection strength" is an index indicative of a likelihood of an identification feature at a position where a candidate feature is detected and is an absolute value of a value acquired by secondary differentiating a pixel value on a measurement line detected from an image in a direction along the measurement line according to this embodiment. In other words, the value increases at a position having a distinctive pixel value on a measurement line and decreases at a position having a flat brightness difference on the line.

As described above, after a candidate feature judged as an outlier is removed, the judgment and the process for removing an outlier may be repeated again until a pair including an outlier no longer exists. Thus, a three-dimensional shape may be measured robustly by alleviating the influence of an outlier.

As described above, according to this embodiment, an outlier included in identification features detected on an image is removed based on a range of intervals between identification features arranged in a pattern so that measurement lines may be identified robustly without an influence of outliers. As a result, a three-dimensional shape of an object having a minute shape may be measured robustly.

By using the relationship B<2A where A is a minimum value of an interval between identification features and B is a maximum value in the pattern outputting unit 201, a candidate feature pair including an outlier may be judged among candidate features of identification features detected on an image, as described above. However, the relationship B<2A is not always required for the arrangement of identification features in a pattern. When a maximum value is lower than two times of a minimum value (B<2A), a candidate feature including an outlier most may be separated.

The outlier judgment method based on an interval between identification features and the outlier judgment method based on a detection strength are used in combination according to this embodiment, only one of them may be used for removing an outlier. For example, the outlier judgment based on an interval between identification features may only be performed, and all of pairs of identification features which may possibly be an outlier may then be removed. Only based on a detection strength, an identification feature having a detection strength equal to or lower than a predetermined threshold value may be removed as an outlier.

The detection strength for comparison between candidate features may be any value as far as it is an index indicative of a likelihood of an identification feature of detected candidate features. As in the fifth embodiment, detection strength may be an absolute value of a value acquired by secondary differentiating a pixel value on a measurement line detected from an image in a direction along the measurement line or a difference between a mean value of pixel values on measurement lines detected from an image and a pixel value at a position of a candidate feature.

Any method may be applied for calculating the ratio s as far as the method calculates a ratio of a minimum value A of an interval between identification features in a pattern projected by the projection apparatus 210 to a length on an image captured by the image capturing apparatus 220. For example, a three-dimensional position may be calculated when two close identification features on measurement lines in a pattern are projected from the projection apparatus 210 to a schematic position for measuring an object. Then, the interval acquired when the two three-dimensional positions are projected to an image captured by the image capturing apparatus 220 may be calculated, and a ratio of the interval in the pattern and the interval on the image may be calculated.

Effects of Embodiments

According to the first embodiment, because a measurement line number may be identified for each one identification feature on a measurement line observed in an image, a measurement line number even in a minute part may be identified. Because a plurality of measurement lines may not include measurement lines arranged at rough intervals, measurement lines may be observed even in a minute part. Thus, according to the first embodiment, a three-dimensional shape of an object having a minute shape may be measured robustly.

According to the second embodiment, a measurement line number for each identification feature detected from an image is identified by applying a constraint regarding an adjacency relationship between identification features so as to reduce misidentifications. As a result, a three-dimensional shape of an object having a minute shape may be measured robustly.

According to the third embodiment, a distribution of identification features in a pattern is adjusted in accordance with a shape of an object to which the pattern is projected to suppress a total number of identification features and thus reduce misidentifications. This is because a suppressed total number of identification features on a pattern may reduce the number of identification features close to an epipolar line on the pattern when identification features detected from the image are identified. As a result, a three-dimensional shape of an object having a minute shape may be measured robustly.

According to the fourth embodiment, candidates of measurement lines to be identified may be narrowed by the positions and types of identification features detected on an image. Thus, misidentification may be reduced. As a result, a three-dimensional shape of an object having a minute shape may be measured robustly.

According to the fifth embodiment, an outlier included in identification features detected on an image is removed based on a range of intervals between identification features arranged in a pattern so that measurement lines may be identified robustly without an influence of outliers. As a result, a three-dimensional shape of an object having a minute shape may be measured robustly.

DEFINITIONS

A projection unit according to the present invention may be any apparatus configured to project a two-dimensional pattern. For example, it may be a projector configured to project a two-dimensional image or other apparatus including a combination of a light source and a mask pattern. A pattern to be projected here may be a light and shade pattern or may be a polychrome pattern. Also in this case, a pattern to be projected is set so as to allow observation of different pixel values or shapes on an image between measurement lines and a background part of the pattern and further allow observation of different pixel values or shapes on the image between the measurement lines and identification features. For example, the brightness or color of projected light may be changed. The identification features may be changed their shapes. In other words, any pattern is applicable as far as the background part, measurement lines and identification features may be distinguished based on image information. In a case where a projection apparatus is used in which a mask pattern is set, the pattern is set physically in the projection apparatus. Thus, no pattern is required to be given from a pattern outputting unit for measurement. Therefore, the pattern outputting unit may be excluded from the configuration according to an embodiment of the present invention.

The identification features may be arranged on measurement lines in any manner as far as they are arranged at unequal intervals. The identification features may be arranged at different unequal intervals from each other on measurement lines such that the correlation between positions of identification features on different lines may be low. Measurement lines having identification features at identical unequal intervals may be included. For example, in a case where there are measurement lines having same identification features, the measurement lines may be identified by changing the colors or thicknesses of measurement lines having identical feature positions and identification feature to give information by which they may be distinguished to prevent misidentification. In a case where an epipolar line is drawn from an identification feature detected on an image to search a corresponding measurement line, a projection apparatus and an image capturing apparatus may be located such that the epipolar line and measurement lines are not vertical. Thus, depending on the inclination of the epipolar line, differences may occur in position (position horizontal to the measurement line) of the intersection between the epipolar line and the measurement lines. Therefore, misidentification may not occur even when identification features are arranged at identical unequal intervals on measurement lines. Uniform random numbers generated within a predetermined range or pseudo-random numbers based on an M sequence may be used for the intervals of identification features. One or more types of identification features may be arranged on a pattern. In a case where a plurality of identification features are arranged on a pattern, any distribution of types of identification features on measurement lines may be used as far as the types of identification features are distributed evenly on the pattern. For example, different types of identification features may be arranged alternately on measurement lines or may be arranged in random order.

All of identification features are not required to be arranged at unequal intervals on measurement lines. Partial identification features may be arranged at equal intervals. In other words, at least partial identification features may be arranged at unequal intervals among identification features on a plurality of measurement lines. In other words, at least partial identification features of identification features on a plurality of measurement lines may be arranged at unequal intervals on the measurement lines.

A distribution of identification features arranged in a pattern may be adjusted based on a shape of an object to which the pattern is to be projected. In this case, a distribution of identification features may be determined in accordance with the degree of minuteness of an object to which the pattern is to be projected such that identification features may be projected at rough intervals to a wide and smooth region where identification features may be easily observed, and identification features may be projected at close intervals to a fine region or a stepped part where identification feature may not be easily observed. For example, a distribution of identification features may be determined by acquiring variations of distances between three-dimensional points in a range to which a corresponding region of the pattern is to be projected from information on three-dimensional points acquired by performing a pre-measurement. Alternatively, it may be determined from an area or variations of distances to a plane to which a corresponding region of the pattern is to be projected based on information on a three-dimensional geometric model of a measurement target object and its position and orientation. In this case, the position and orientation of a measurement target object may be acquired by pattern matching from an image acquired by imaging the measurement target object, may be given by a user through a user interface or may be acquired from a 6 degrees of freedom sensor attached to the measurement target object. An image projecting a geometric model of a measurement target object on a pattern may be presented to a user, and the user may be prompted to input a designated positions of identification features for each region of the pattern. A memory, not illustrated, which holds a degree of minuteness of an object shape to which a pattern is to be projected may be separately prepared, and a distribution of identification features may be calculated based on a degree of minuteness read from the memory. The brightnesses and locations of measurement lines and identification features of a pattern to be projected may be set by a pattern generation unit which is provided separately, instead of the pattern outputting unit.

The image acquiring unit may acquire any image as far as it is a two-dimensional image. For example, it may be a gray image or a polychrome image. Such an image may be acquired directly from the image capturing unit or may be saved in a memory once and be then acquired from the memory.

Any method is applicable for detecting measurement lines in the pattern detecting unit as far as the method detects lines on an image. For example, a line may be detected by labeling an edge detected with a sobel filter or may be detected by performing a thinning process on an image binarized with a predetermined threshold value. Any method is applicable for detecting an identification feature on a measurement line as far as the method detects identification features having different pixel values on measurement lines. For example, a position having an extremum pixel value on a measurement line may be detected, or a position of a pixel having a predetermined value of a difference from an mean value of pixel values on measurement lines. In a case where the width of an identification feature is increased as an example that the shape of an identification feature on a measurement line is changed, a position having an extremum line width on a measurement line may be searched to detect an identification feature having a different shape on a measurement line.

The method for identifying measurement line numbers for identification features detected from an image by the pattern identifying unit may include calculation based on positions of the identification features or identification using a adjacency relationship between identification features. A plurality of types of identification features may be given such that corresponding measurement lines may be identified based on the positions and types of identification features.

Any method using adjacency relationship between identification features is applicable as far as a measurement line number is identified for an identification feature in a manner that the adjacency relationship between identification features on an image and the order of measurement line numbers calculated from the identification features may be matched. For example, a measurement line number for each identification feature may be identified by using an optimization algorithm based on identification costs of identification features and a constraint of adjacency relationship between identification features. A measurement line number may be identified based on votes for identification results acquired by polling a measurement line number identified from an identification cost of each identification feature to a surrounding adjacent identification feature. The optimization calculation may apply BP (Belief Propagation) or GC (Graph Cut).

The method for calculating a position of a three-dimensional point on a surface of a measurement target object to which the three-dimensional measuring unit projects a pattern may be any method based on a light section method.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Advantages of Invention

According to the present invention, a three-dimensional shape of an object having a minute shape may be measured robustly.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-007938, filed Jan. 20, 2014, and Japanese Patent Application No. 2014-220689, filed Oct. 29, 2014, which are hereby incorporated by reference herein in their entirety.

What is claimed is:

1. A three-dimensional measurement apparatus comprising at least one processor coupled to at least one memory, the at least one processor executing instructions to:
   acquire an image including an object to which a pattern is projected, wherein the pattern includes a plurality of lines and in which a plurality of features on at least one line among the plurality of lines are arranged so that a maximum value of an interval between adjacent features on a same line is lower than two times of a minimum value of the interval between the adjacent features on the same line and the maximum value is greater than the minimum value;
   detect lines and features of the projected pattern in the acquired image;
   identify to which line of the plurality of lines of the pattern each of the detected features belongs based on positions of the detected features; and
   measure a three-dimensional shape of the object to which the pattern is projected based on an identification result.

2. The three-dimensional measurement apparatus according to claim 1, wherein features on the plurality of lines are regions in which at least one of their brightnesses, colors, and shapes are different or breaks of the lines.

3. The three-dimensional measurement apparatus according to claim 1,
   wherein, based on a degree of correspondence with the plurality of lines in the pattern calculated based on positions of detected features and an order of a plurality of detected features on the image, the at least one processor further executes the instructions to select, from combinations of solutions each indicating to which of the plurality of lines in the pattern each of a plurality of detected features belongs, a combination having a high degree of correspondence and high matching between the order and the combinations of the solutions to identify to which line of the plurality of lines in the pattern each of the detected features belongs.

4. The three-dimensional measurement apparatus according to claim 1, wherein the pattern has a single type of features on the plurality of lines.

5. The three-dimensional measurement apparatus according to claim 1, wherein the pattern has a plurality of types of features on the plurality of lines.

6. The three-dimensional measurement apparatus according to claim 1, wherein a maximum value of an interval between at least partial feature on the plurality of lines is lower than two times of a minimum value of the interval in the pattern.

7. The apparatus according to claim 1, wherein the at least one processor further executes the instructions to project the pattern to the object.

8. The three-dimensional measurement apparatus according to claim 7, wherein the at least one processor further executes the instructions to set a distribution of features arranged on the plurality of lines based on a three-dimensional shape of the object to which the pattern is to be projected.

9. The three-dimensional measurement apparatus according to claim 8, wherein the at least one processor further executes the instructions to set a distribution of features arranged on the plurality of lines based on a variance of distances of three-dimensional points of the object.

10. The three-dimensional measurement apparatus according to claim 8, wherein the at least one processor further executes the instructions to set a distribution of features arranged on the plurality of lines based on an area of a plane of the object.

11. The apparatus according to claim 1, wherein features on at least two lines are arranged at unequal intervals.

12. The apparatus according to claim 1, wherein the at least one processor further executes the instructions to remove a feature that does not satisfy a predetermined condition from the detected features.

13. A three-dimensional measurement apparatus comprising at least one processor coupled to at least one memory, the at least one processor executing instructions to:
   acquire an image including an object to which a pattern is projected, wherein the pattern includes a plurality of straight lines and in which at least one break on the plurality of lines is arranged so that a maximum value of an interval between adjacent features on a same line is lower than two times of a minimum value of the interval between the adjacent features on the same line and the maximum value is greater than the minimum value;
   detect the at least one break on the line in the acquired image;
   identify to which line of the plurality of lines each of the detected at least one break belongs; and
   measure a three-dimensional shape of the object to which the pattern is projected based on an identification result.

14. The three-dimensional measurement apparatus according to claim 13, wherein the at least one processor further executes the instructions to acquire the image imaged from an image capturing device.

15. A three-dimensional measurement method comprising:
- acquiring an image including an object to which a pattern is projected, wherein the pattern includes a plurality of lines and in which a plurality of features on at least one line among the plurality of lines are arranged so that a maximum value of an interval between adjacent features on a same line is lower than two times of a minimum value of the interval between the adjacent features on the same line and the maximum value is greater than the minimum value;
- detecting lines and features of the projected pattern in the image acquired by the acquiring;
- identifying to which line of the plurality of lines of the pattern each of the features detected by the detecting belongs based on positions of the features detected by the detecting; and
- measuring a three-dimensional shape of the object to which the pattern is projected based on an identification result of the identifying.

16. A three-dimensional measurement method comprising:
- acquiring an image including an object to which a pattern is projected, wherein the pattern includes a plurality of straight lines and in which at least one break on the plurality of lines is arranged so that a maximum value of an interval between adjacent features on a same line is lower than two times of a minimum value of the interval between the adjacent features on the same line and the maximum value is greater than the minimum value;
- detecting the break on the line in the image;
- identifying to which line of the plurality of lines each of breaks detected by the detecting belongs; and
- measuring a three-dimensional shape of the object to which the pattern is projected based on an identification result of the identifying.

17. A non-transitory computer-readable storage medium storing a program causing a computer to execute:
- acquiring an image including an object to which a pattern is projected, wherein the pattern includes a plurality of lines and in which a plurality of features on at least one line among the plurality of lines are arranged so that a maximum value of an interval between adjacent features on a same line is lower than two times of a minimum value of the interval between the adjacent features on the same line and the maximum value is greater than the minimum value;
- detecting lines and features of the projected pattern in the image acquired by the acquiring;
- identifying to which line of the plurality of lines of the pattern each of the features detected by the detecting belongs based on positions of the features detected by the detecting; and
- measuring a three-dimensional shape of the object to which the pattern is projected based on an identification result of the identifying.

18. A non-transitory computer-readable storage medium storing a program causing a computer to execute:
- acquiring an image including an object to which a pattern is projected, wherein the pattern includes a plurality of straight lines and in which at least one break on the plurality of lines is arranged so that a maximum value of an interval between adjacent features on a same line is lower than two times of a minimum value of the interval between the adjacent features on the same line and the maximum value is greater than the minimum value;
- detecting the break on the line in the image;
- identifying to which line of the plurality of lines each of breaks detected by the detecting belongs; and
- measuring a three-dimensional shape of the object to which the pattern is projected based on an identification result of the identifying.

* * * * *